(12) United States Patent
Sjöström et al.

(10) Patent No.: US 6,318,802 B1
(45) Date of Patent: Nov. 20, 2001

(54) DEVICE FOR ADJUSTMENT OF A VEHICLE SEAT, AND A BASE FRAME FOR A VEHICLE SEAT

(75) Inventors: Staffan Sjöström, Grödinge; Stefan Jonsson, Södertälje; Sten-Erik Lestander, Mariefred, all of (SE)

(73) Assignee: Scania CV Aktiebolag (SE)

( * ) Notice: Subject to any disclaimer, the term of this patent is extended or adjusted under 35 U.S.C. 154(b) by 0 days.

(21) Appl. No.: 09/331,038

(22) PCT Filed: Nov. 2, 1998

(86) PCT No.: PCT/SE98/01979

§ 371 Date: Jun. 15, 1999

§ 102(e) Date: Jun. 15, 1999

(87) PCT Pub. No.: WO99/24286

PCT Pub. Date: May 20, 1999

(30) Foreign Application Priority Data

Nov. 11, 1997 (SE) .................................................... 9704156
Apr. 9, 1998 (SE) .................................................... 9801277

(51) Int. Cl.[7] .................................................... A47C 1/02
(52) U.S. Cl. .................................. 297/344.1; 297/344.14; 296/65.13
(58) Field of Search ............................ 297/344.1, 344.11, 297/344.14, 344.16; 296/65.13, 65.14; 248/429, 430

(56) References Cited

U.S. PATENT DOCUMENTS

| 3,448,820 | 6/1969 | Aiello et al. | |
|---|---|---|---|
| 3,826,530 | * 7/1974 | Hoffmeyer et al. | ............... 296/65.13 |
| 3,841,696 | 10/1974 | Wagner . | |
| 4,262,958 | * 4/1981 | Houseman et al. | ........... 296/65.13 X |
| 4,944,555 | * 7/1990 | Brusasco | ...................... 297/344.14 X |

FOREIGN PATENT DOCUMENTS

| 655918 | * 1/1963 | (CA) | ................................ 297/344.14 |
|---|---|---|---|
| 2647288 | 4/1978 | (DE) . | |
| 2806795 | 8/1979 | (DE) . | |
| 0301461 | 2/1989 | (EP) . | |

* cited by examiner

Primary Examiner—Laurie K. Cranmer
(74) Attorney, Agent, or Firm—Ostrolenk, Faber, Gerb & Soffen, LLP

(57) ABSTRACT

In an arrangement for a seat (2) in a vehicle, the seat is movable in a longitudinal direction along a plane (33) which slopes relative to the horizontal plane. The subframe of the seat (2) consists of devices (30, 31) fastened respectively to the vehicle and to the seat, which devices consist of two substantially similar triangular supporting frames. Resetting between a predetermined driving position and a likewise predetermined resting position is made possible by a control device (16) which is fastened to the device (30) which is itself fastened to the vehicle, which control device cooperates with a locking device fastened to the seat so that during a relocating movement between forward and rear positions of the seat the locking device (17) becomes free from at least one locking position between the vehicle seat and the device (30) fastened to the vehicle.

26 Claims, 3 Drawing Sheets

DEVICE FOR ADJUSTMENT OF A VEHICLE SEAT, AND A BASE FRAME FOR A VEHICLE SEAT

BACKGROUND OF THE INVENTION

The present invention relates to an arrangement for enabling a vehicle seat to be moved forward and rearwardly, to be locked in a forward operating position and to be readily unlocked for rearward movement and a subframe which is fastenable to the vehicle floor below it and to the seat above it, which permits the seat to slide forward and rearward, which enables. the seat to be locked in a forward position and which enables the seat to be moved rearwardlye.

STATE OF THE ART

A generally known arrangement is for vehicle seats, particularly driving seats, to be movable in the longitudinal direction of the vehicle in order to make convenient positioning possible for the seat user and/or create more clear space in the interior of the vehicle. In such cases the seat is usually mounted on longitudinal rails situated in a plane which either slopes somewhat upwards in the forward direction of the vehicle or substantially horizontally. This consequently makes it possible to move the seat along the corresponding plane. Such an arrangement does limit, however, the possibility of easily climbing into and out of the vehicle and getting into and out of the vehicle seat, particularly in vehicles of the truck and bus type. Operating the seat securing mechanism for manual setting of the seat in the longitudinal direction also involves control action during the whole setting movement and often entails one or more extra setting movements before the desired securing position is reached.

BRIEF DESCRIPTION OF THE INVENTION

The object of the present invention is to provide a seat arrangement that manifestly reduces the abovementioned disadvantages of the state of the art. The invention aims at seat control which, particularly in truck cabs, makes it easy to reset the seat between a predetermined driving position and a likewise predetermined resting position not intended to be a driving position. The solution has also to make possible a simple form of control mechanism with simple and inexpensive components without having to disregard the safety requirement of reliable securing of the seat.

To this end, the invention is distinguished by a control device that cooperates with the seat locking device during relocation of the seat between the forward and rear positions, freeing the locking device from a locking position to free the seat to move to the rear position. The features therein indicated makes it possible for the seat to be provided with a longitudinal relocating movement between a forward (driving) position and a rear (resting) position by easy manual operation of a control which acts upon the seat locking device. Rail mechanisms of standard types which are simple, inexpensive but well-proven from the safety point of view can be used for the purpose. The co-operation according to the invention between control device and locking device also makes it possible to reset the seat quickly and safely between preselected forward and rear positions. This solution is particularly advantageous in the case of seats of the type which can be relocated along a plane which slopes downwards in the forward direction of the vehicle. Such seats are used with advantage in vehicles of the truck and bus type which are entered by climbing and in which it is possible to sit down in the seat from an almost standing position.

In an advantageous embodiment of the invention, the seat can be moved rearwards with the assistance of a first force to a rear (resting) position. This makes it possible for a person sitting in the seat to cause it to move to a rear position by simply lightening his weight on the seat and by operating manually the control which acts upon the securing mechanism.

In another embodiment, the seat can be moved forwards, i.e. from the rear position to a forward (driving) position, against the action of a second force. This means that in the case of seats of the aforesaid type which can be moved along a plane which slopes downwards in the forward direction of the vehicle, the movement can take place against the action of the second force so that when a person sits on the seat while it is at an upper resting position the seat will automatically, by a controlled movement, assume a driving position.

BRIEF DESCRIPTION OF THE DRAWINGS

A preferred embodiment of the invention is described below with reference to the attached drawings, in wich.

DESCRIPTION OF PREFERRED EMBODIMENT

Figure 1:
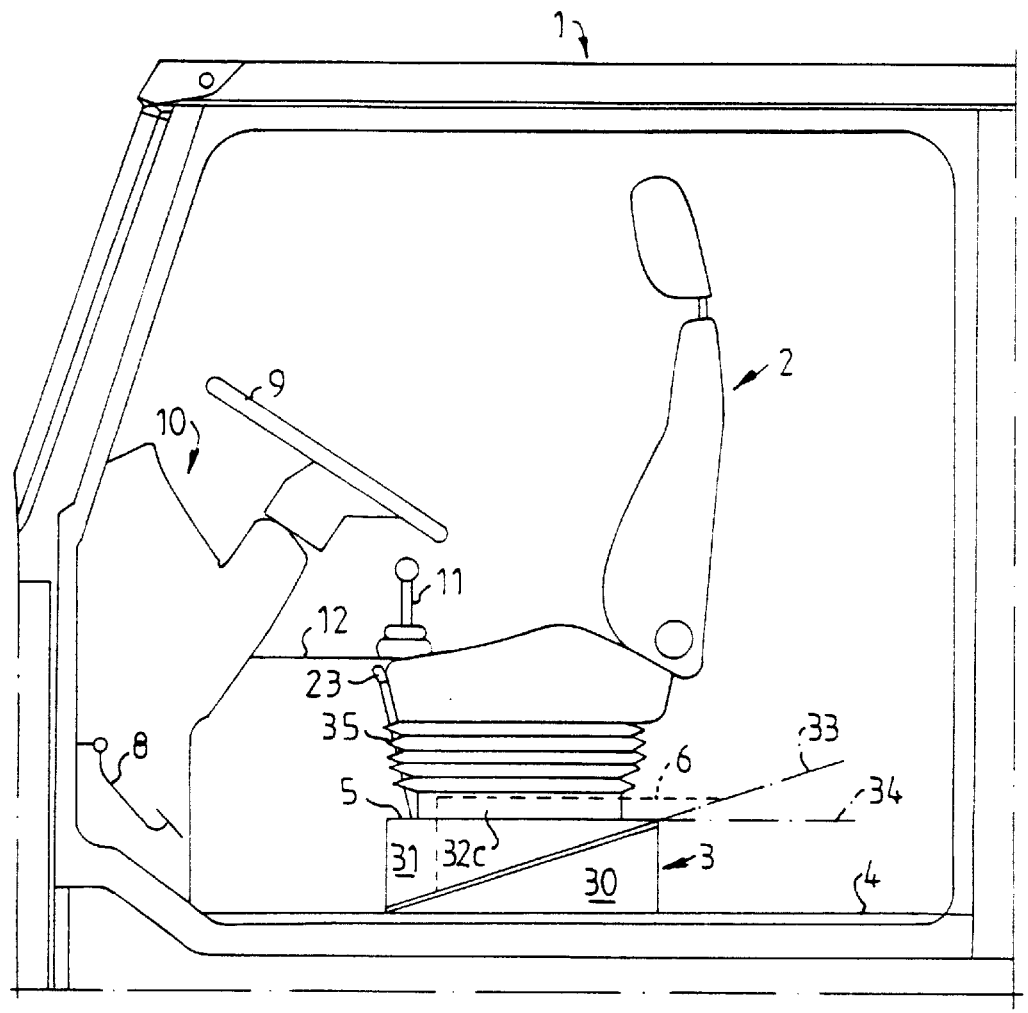
FIG. 1 shows schematically a side view of a vehicle cab with a seat arrangement according to the invention.

A truck cab 1 is depicted schematically in FIG. 1. A driver's area contains a driving seat 2 with a subframe 3 which is fastened to the cab floor 4. The seat 2 can be moved in the longitudinal direction of the vehicle from a forward (driving) position 5 to a rear (resting) position 6 which is not intended to be used when the vehicle is being driven. FIG. 1 shows only the subframe 3 in the resting position, but it is implicit that when moving to the rear position 6 the subframe 3 is accompanied by the seat 2 with its frame 35. A pedal set 8, a steering wheel 9 and an instrument panel 10 are situated in a conventional manner in front of the seat. A gear lever 11 and a lever 23 forming part of a securing device 15 (depicted in FIGS. 2 and 3) according to the invention are situated to the side of the seat. An engine cover 12 also protrudes into the cab and to some extent separates the driving side from the passenger side.

Figure 2:
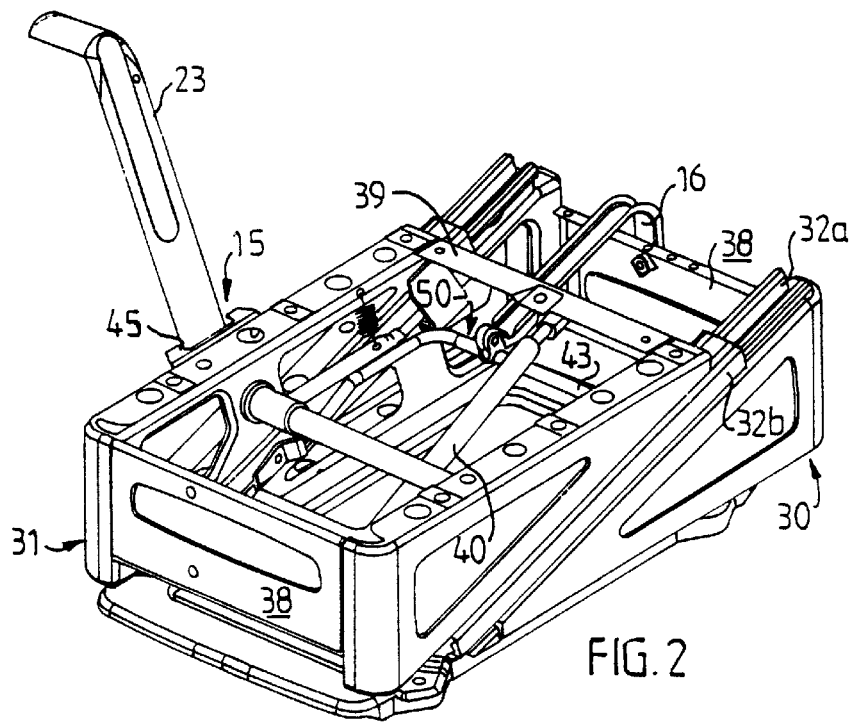
FIG. 2 shows a perspective view of a seat subframe according to the invention.

The subframe 3 is composed advantageously of two substantially similar elements 30,31, each of which has a triangular shape in the vertical plane (see FIG. 2). Each element is composed of two triangular sideplates whose sides, which are short catheti, are joined together by an endplate 38 and, at the opposite end, by the corner sections of an angle plate 39. The underside of the element 30, which is a cathetus, is intended to be fastened to the vehicle floor, advantageously by undepicted screws or bolted connections. The hypotenuse side of the element 30 bears a rail device 32a in the form of a rail on each triangular sideplate. The rail device 32a forms a plane 33 which slopes relative to the horizontal plane and which is represented in FIG. 1 by a chain-dotted line. The subframe 3 and its elements 30,31 are so arranged that the sloping plane 33 slopes downwards in the forward direction of the vehicle.

Figure 3:
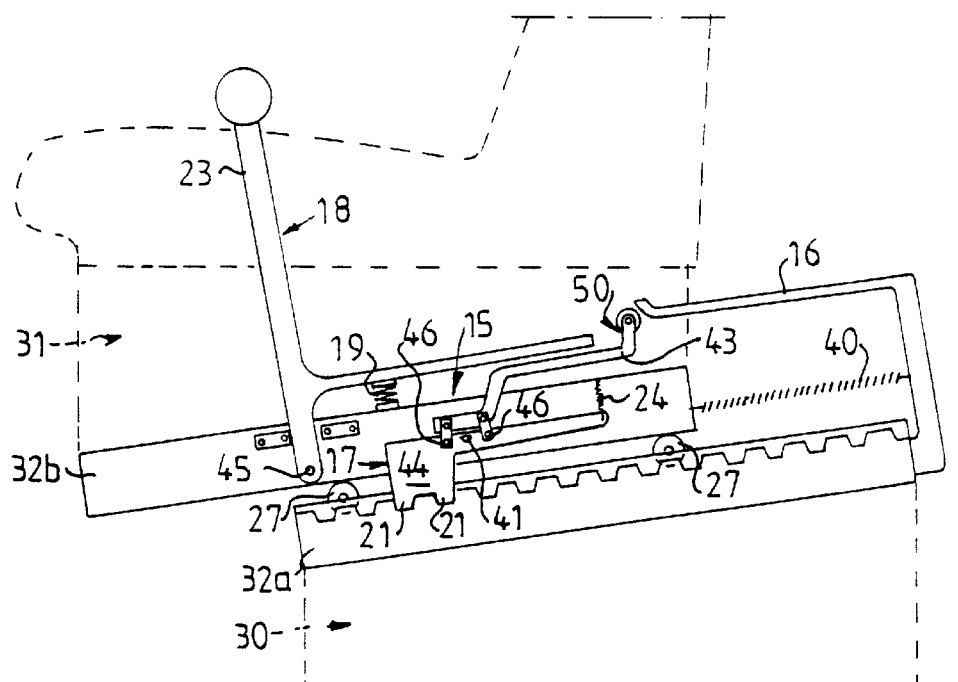
FIG. 3 shows a schematic arrangement according to the invention for mutual locking of the subframe components.

The hypotenuse side of the upper element 31 correspondingly bears a rail device 32b for cooperation with the rail device 32a of the lower element 30. The top of the upper element 31 supports a rail device 32c (depicted in FIG. 1) for co-operation with a corresponding rail device on the underside of the frame 35. Said co-operation makes a longitudinal relocating movement possible along the horizontal plane 34 formed by these rail devices, which is represented in FIG. 1 by a chain-dotted line. All the rail devices 32a, 32b and 32c are of a conventional standard type which has toothed recesses for locking in various positions at will and which conform to stringent safety requirements but are described in no further detail here. FIG. 3 shows schematically the rail devices 32a,32b with roller devices 27 for easy frictionless longitudinal relocating movement between the elements 30,31.

A return spring 40, advantageously in the form of a gas spring as depicted in FIG. 2, is arranged between the forward end portion of the lower element 30 (as seen in the forward direction of the vehicle) and the rear end portion of the upper element 31, preferably in a longitudinal symmetry plane between their angle plates 39. When the upper element 31 is in the forward end position 5 (depicted in FIGS. 1 and 2) relative to the lower element 30, the gas spring is in a compressed state. In that situation, the mechanical securing device 15 which locks the elements 30,31 to one another prevents the gas spring 40 from pushing the upper element 31 upwards and rearwards along the rails 32a,32b.

In an advantageous embodiment of the securing device 15 according to FIGS. 2 and 3, a running track 16 fastened to the lower element 30 (which is itself fastened to the vehicle) co-operates with a rear end section 50 of a locking device 17. The latter is supported for pivoting about a spindle 41 on the upper element 31 and incorporates on either side of the seat a locking part 44 and a yoke 43 which is fastened thereto by separate fastening devices 46 and which is entered by the rear end section 50. The yoke 43 consequently extends between the two sides of the upper element 31, and the two locking parts 44 are each supported for pivoting about the spindle 41. The locking device 17 itself co-operates with a release device 18 which is mounted for pivoting about a spindle 45 on the upper element 31. Manual operation of the substantially vertical lever 23 which is readily accessible to the driver and situated beside the seat, level with the seat cushion, will make the release device 18, against the action of a spring 19, cause the locking parts 44 and the yoke 43 of the locking device 17 to pivot clockwise, in FIG. 3, about the spindle 41. The forward toothed ends 21 of the locking parts will thus be raised from a co-operating securing position relative to the toothed rails 32a which are fastened along both sides of the lower element 30 (which is itself fastened to the vehicle). This raising takes place against the action of a spring 24 whose ends are fastened to the respective locking part 44 and to the upper element 31. The running track 16 is with advantage placed alongside a longitudinal symmetry plane of the elements 30,31, and the yoke 43 has a more or less symmetrical extent as seen in a horizontal plane, resulting in substantially even distribution of the forces acting upon the rails.

Pivoting the lever 23 about its spindle 45 causes the yoke 43 to be acted upon so that the locking parts 44 can be raised from their securing positions. When this has taken place, the spring 40 urges the upper element 31 rearwards along the plane 33. In cases where the plane 33 exhibits a definitely downward forward slope, this takes place against the action of the person sitting in the seat who, by slightly reducing his weight on the seat, makes the movement possible. The force exerted by the spring 40 has a component in the vertical direction which, depending on the slope of the plane 33, constitutes a predetermined proportion of a statistical mean of the weight of adult persons.

Figure 4:
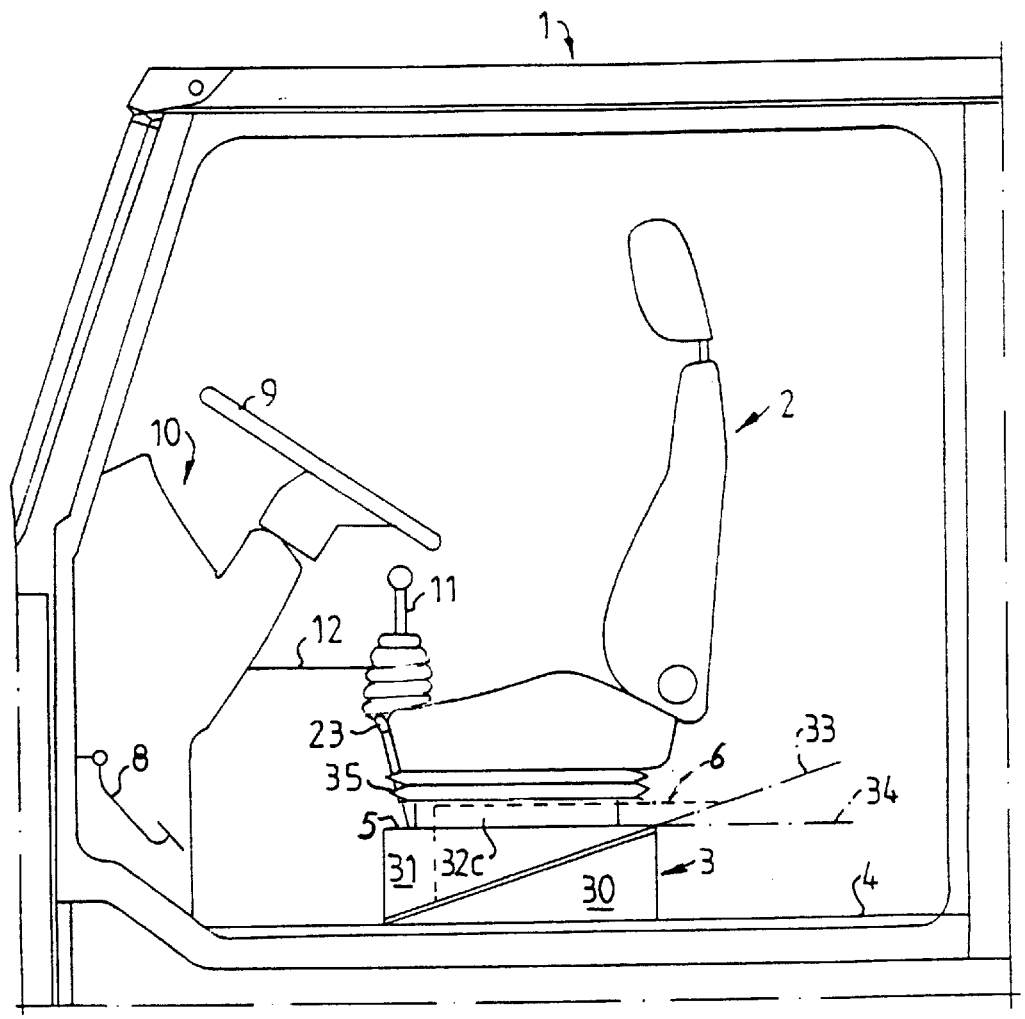
FIG. 4 shows the same view as FIG. 1 with the seat arrangement at a different height.

The yoke 43 and its rear end section 50 which is provided with a roller and is intended to cooperate with the running track 16 are urged by the action exerted by the respective springs 40 of the locking parts 44 to bear on the running track 16 during the movement of the element 31 along the rails 32a,32b to a rear end position. This movement is limited by the maximum length of the gas spring 40 (see FIG. 2) and/or by a purely mechanical stop, e.g. in the form of a considerable downward bend (depicted in FIGS. 2 and 3) of the running track 16. In this case, no seat position locking takes place at the upper end position, as the seat will slide down along the plane if the weight load exceeds the aforesaid vertical force component. Only when the rear end device 50 of the yoke leaves the upwardly rounded forward end of the running track 16 can the locking parts 44 assume a securing position relative to the lower element 30. the invention thus makes possible a predetermined driving position of the seat which can be finely adjusted in a conventional manner by setting the seat in the longitudinal direction by means of the rails which are fastened in the horizontal plane 34 to the top of the upper element 31. The seat can also be set in the vertical direction by means of a height setting device in the seat frame 35 in a manner shown in FIG. 4, where one can see the seat at a lowered height, as compared with FIG. 1.

The lever 23 is so placed as to be operable not only by a person sitting in the seat but also by another person who is in the cab or interior of the vehicle and can accordingly easily act upon the lever, inter alia by means of his foot, to move the seat to either end position. In a truck cab the seat can thus be moved to the forward position to provide extra clear space in the cab, e.g. to make overnighting in it more comfortable. The lever 23 may also be provided with a securing arrangement to prevent inadvertent manual operation. The securing arrangement may consist of a recess 47 from which the lever 23 has to be raised by a tilting movement transverse to the forward direction of the seat, against the action of a spring (not depicted here), before the lever can be operated.

The securing device may of course take various different forms, e.g. with the possibility of a securing position in a rear (resting) position of the seat In driving seat applications, however, it is advantageous for it to be designed to only secure the lower (driving) position, while the resting position has no securing arrangement. This eliminates the risk of the driver being able to set the vehicle in motion while the seat is in the resting position. It has instead the advantageous effect that the driver glides in a controlled manner down the sloping plane as soon as the seat is sat on in its resting position, whereupon the preset driving position is automatically assumed. It is of course also possible to choose from among a number of alternative end positions below the end of the running track, which can be achieved by the release device being operated while at the same time the driver suitably increases the weight force on the seat in order to overcome said vertical force component. This will usually be unnecessary, however, since the seat still has the possibility of longitudinal setting by movement along the rails in the horizontal plane which are fastened to the top of the upper element 31.

What is claimed is:

1. An arrangement for a vehicle seat which is movable forward and rearwardly relative to a device fastened in the vehicle, the arrangement comprising:

a vehicle seat in the vehicle, movable forwardly in the vehicle and movable rearwardly to a rear end position;

a locking device between the vehicle seat and the device fastened in the vehicle, the locking device being operable to lock a position of the vehicle seat relative to the device fastened in the vehicle in the forward and rear directions;

a release device for preventing the locking of a position of the locking device;

a control device connected with the release device for being operated by operation of the release device, the control device cooperating with the locking device during relocation of the seat between the forward and rearward positions thereof for freeing the locking device from at least one locking position thereof between the vehicle seat and the device fastened in the vehicle so that the seat may be moved rearwardly and forwardly without interference by the locking device;

wherein the rear end position of the seat is a resting position of the seat and is rearward enough so that the seat in the resting position is normally not intended for use when the vehicle is in motion.

2. The arrangement of claim 1, wherein the locking device includes a rail between the seat and the device fastened in the vehicle, the seat being mounted for movement along the rail, the rail having a plurality of locking positions for the seat located along the rail.

3. The arrangement of claim 2, wherein the rail is oriented in a plane which slopes downwardly in the forward movement direction of the seat and of the vehicle, so that the seat is movable forward and rearward in the longitudinal direction along the slope.

4. The arrangement of claim 3, wherein the control device operates on the locking device to cause the locking device to lock the vehicle seat against movement at at least one forward position of the vehicle seat, which is a normal position of use of the seat, relative to the device fastened in the vehicle, during vehicle operation.

5. The arrangement of claim 2, wherein the control device is operable for disabling the locking device from locking the seat relative to the device fastened in the vehicle at the rear end position.

6. The arrangement of claim 5, wherein the control device comprises a track which extends in a longitudinal direction of the vehicle and is fastened to the device fastened in the vehicle;

the locking device includes a first portion which engages the track after the seat with the locking device moves rearwardly to and beyond a first rear position prior to the rear end position, the locking device further comprising a securing portion which locks to a selected one of the locking positions of the rail, the first portion of the locking device and the track being shaped and positioned so that upon engagement of the first portion of the locking device with the track, the locking device is moved by the engagement with the track for releasing the securing part of the locking device from the locking positions of the rail for enabling the seat to be moved forwardly and rearwardly along the rail without the locking portion of the locking device locking to the rail and without locking the seat against the movement forwardly and rearwardly.

7. The locking device of claim 6, further comprising a spindle extending transversely of the longitudinal direction of the vehicle, the locking device being pivotally mounted on the spindle with the first portion at one side of the pivot spindle and the locking portion at the other side of the pivot spindle.

8. The arrangement of claim 7, wherein the first portion of the locking device is rearward of the spindle in the longitudinal direction of the vehicle and the locking portion of the locking device is forward of the spindle in the longitudinal direction of the vehicle.

9. The arrangement of claim 7, wherein the track is above the first portion of the locking device when they are engaged and the rail is below the locking device;

means for applying a first force for urging the first portion of the locking device against the track.

10. The arrangement of claim 7, wherein the track has a front end portion with respect to the longitudinal direction of the vehicle and positioned for permitting the securing portion of the locking device to engage one of the locking positions of the rail, and the track has a rear end portion which is rearward with respect to the longitudinal direction of the vehicle and which is shaped and positioned for preventing the securing portion of the locking device from locking to the rail.

11. The arrangement of claim 10, wherein the track further comprises a stop for preventing further rearward movement of the locking device past the stop and for stopping rearward movement of the seat.

12. The arrangement of claim 7, wherein the release device is pivotally supported on the seat and includes a lever that extends up from the seat for being moved for moving the release device, and the release device being movable by the lever for moving the locking device.

13. The arrangement of claim 12, wherein the lever extends substantially vertically upward and has an upper end situated to the side of the seat.

14. The arrangement of claim 6, wherein the track is above the first portion of the locking device when they are engaged and the rail is below the locking device;

means for applying a first force for urging the first portion of the locking device against the track.

15. The arrangement of claim 6, wherein the track has a front end portion with respect to the longitudinal direction of the vehicle and positioned for permitting the securing portion of the locking device to engage one of the locking positions of the rail, and the track has a rear end portion which is rearward with respect to the longitudinal direction of the vehicle and which is shaped and positioned for preventing the securing portion of the locking device from locking to the rail.

16. The arrangement of claim 1, wherein the control device operates on the locking device to cause the locking device to lock the vehicle seat against movement at least one forward position of the vehicle seat, and the at least one forward position is a normal position of use of the seat, relative to the device fastened in the vehicle, during vehicle operation.

17. The arrangement of claim 1, wherein the control device is operable for disabling the locking device from locking the seat relative to the device fastened in the vehicle at the rear end position.

18. The arrangement of claim 1, further comprising a subframe beneath the seat, the subframe including an upper element, the upper element having an underside that cooperates with the device fastened to the vehicle, the subframe upper element having a topside that cooperates with and supports the seat, and the cooperations on both the underside and the topside of the upper element of the subframe enable the subframe to move relative to the device fastened in the vehicle and enable the seat to move relative to the subframe, both movements along the longitudinal direction of the vehicle.

19. The arrangement of claim 1, wherein the seat height is settable in a substantially vertical direction.

20. An arrangement for a vehicle seat which is movable forward and rearwardly relative to a device fastened in the vehicle, the arrangement comprising:
   a vehicle seat in the vehicle, movable forwardly in the vehicle and movable rearwardly to a rear end position;
   a locking device between the vehicle seat and the device fastened in the vehicle, the locking device being operable to lock a position of the vehicle seat relative to the device fastened in the vehicle in the forward and rear directions;
   a release device for preventing the locking of a position of the locking device;
   a control device connected with the release device for being operated by operation of the release device, the control device cooperating with the locking device during relocation of the seat between the forward and rearward positions thereof for freeing the locking device from at least one locking position thereof between the vehicle seat and the device fastened in the vehicle so that the seat may be moved rearwardly and forwardly without interference by the locking device;
   further comprising means for applying a first force for assisting the rearward movement of the seat.

21. The arrangement claim 20, further comprising means for applying a second force for opposing the forward movement of the seat.

22. The arrangement of claim 21, wherein the locking device includes a rail between the seat and the device fastened in the vehicle, the seat being mounted for movement along the rail, the rail having a plurality of locking positions for the seat located along the rail.

23. The arrangement of claim 22, wherein the rail is oriented in a plane which slopes downwardly in the forward movement direction of the seat and of the vehicle, so that the seat is movable forward and rearward in the longitudinal direction along the slope.

24. An arrangement for a vehicle seat which is movable forward and rearwardly relative to a device fastened in the vehicle, the arrangement comprising:
   a vehicle seat in the vehicle, movable forwardly in the vehicle and movable rearwardly to a rear end position;
   a locking device between the vehicle seat and the device fastened in the vehicle, the locking device being operable to lock a position of the vehicle seat relative to the device fastened in the vehicle in the forward and rear directions;
   a release device for preventing the locking of a position of the locking device;
   a control device connected with the release device for being operated by operation of the release device, the control device cooperating with the locking device during relocation of the seat between the forward and rearward positions thereof for freeing the locking device from at least one locking position thereof between the vehicle seat and the device fastened in the vehicle so that the seat may be moved rearwardly and forwardly without interference by the locking device;
   the control device comprises a track which extends in a longitudinal direction of the vehicle and is fastened to the device fastened in the vehicle;
   the locking device includes a first portion which engages the track after the seat with the the locking device moves rearwardly to and beyond a first rear position prior to the rear end position,
   the locking device further comprising a securing portion which locks to a selected one of the locking positions of the tail, the first portion of the locking device and the track being shaped and positioned so that upon engagement of the first portion of the locking device with the track the locking device is moved by the engagement with the track for releasing the securing part of the locking device from the locking positions of the rail for enabling the seat to be moved forwardly and rearwardly along the rail without the locking portion of the locking device locking to the rail and without locking the seat against the movement forwardly and rearwardly.

25. A subframe for a vehicle seat comprising:
   a lower supporting frame which is triangular in shape in a vertical plane, has a bottom side that is fastenable to the vehicle floor and has a top side that is a hypotenuse of the triangular shape, the lower frame being oriented so that the top side is inclined downward forward; a first rail on the top side of the lower frame and oriented in a forward sloping plane;
   an upper supporting frame above the lower supporting frame, the upper frame also is triangular in shape in a vertical plane, the upper frame has a bottom side that is a hypotenuse of the triangular shape and that carries a second rail for cooperating with the first rail on the lower frame, the upper frame has an upper side on which a seat is supported;
   at least one of the bottom side of the lower frame and the top side of the upper frame having a third rail thereon and the respective one of the seat at the top side of the upper frame and the device in the vehicle at the bottom side of the lower frame having a fourth rail for cooperating with the third rail, both the third and fourth rails extending generally horizontally, such that movement of the third and fourth rails in the longitudinal direction of the vehicle and with respect to each other moves the seat generally along a horizontal plane;
   one of the frames including a locking device for enabling the locking of the seat in a forward position with respect to the longitudinal direction of the vehicle;
   a control device operable during upward and rearward movement of the upper frame with respect to the lower frame toward an upper resting position of the seat for releasing the locking device to prevent the locking device from locking the seat against forward and rearward movement and for enabling the seat to be moved to the upper resting position that is normally not intended for use of the seat when the vehicle is in motion, and for operating the locking device to become free from locking the seat in at least one available locking position for the seat in the longitudinal direction.

26. The subframe of claim 25, further comprising a spring acting on one of the frames to move one of the frames along the sloping plane of the first and second rails.

* * * * *